June 9, 1964     C. D. LUNDEN     3,136,965
ELECTROMAGNETIC WAVE GUIDE OF LUNATE CROSS SECTION
Filed Sept. 22, 1960                          2 Sheets-Sheet 1
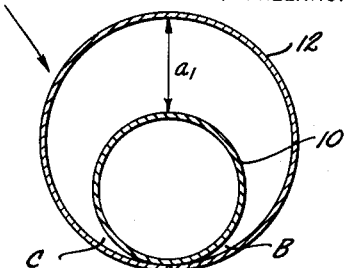
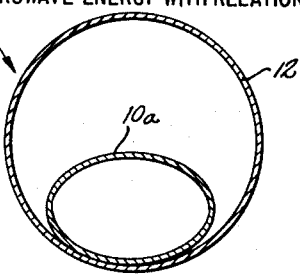
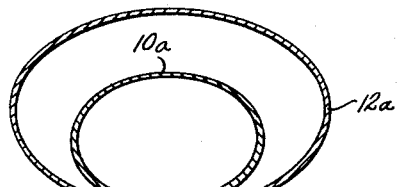
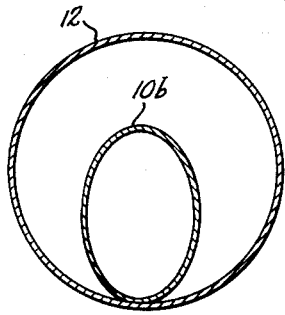
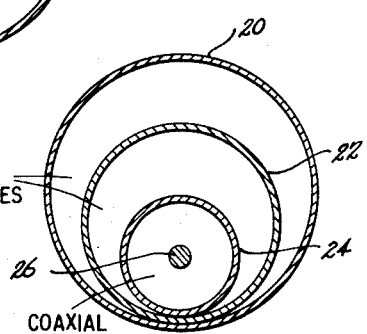
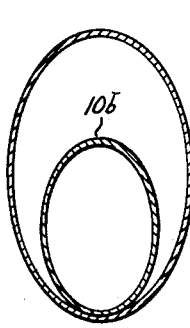
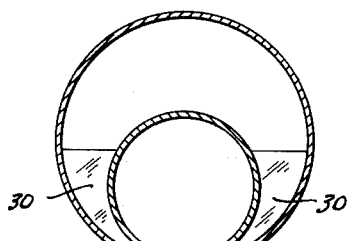
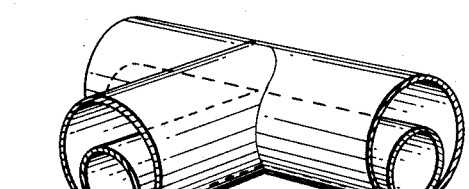
INVENTOR.
CLARENCE D. LUNDEN
BY
Reynolds & Christensen
ATTORNEYS June 9, 1964 C. D. LUNDEN 3,136,965
ELECTROMAGNETIC WAVE GUIDE OF LUNATE CROSS SECTION
Filed Sept. 22, 1960 2 Sheets-Sheet 2

INVENTOR.
CLARENCE D. LUNDEN
BY
Reynolds & Christensen
ATTORNEYS

United States Patent Office 3,136,965
Patented June 9, 1964

3,136,965
ELECTROMAGNETIC WAVE GUIDE OF LUNATE CROSS SECTION
Clarence David Lunden, Tacoma, Wash., assignor to Boeing Airplane Company, Seattle, Wash., a corporation of Delaware
Filed Sept. 22, 1960, Ser. No. 57,705
2 Claims. (Cl. 333—95)

This invention relates to improved wave guide configurations and constructions, and more particularly to guides of particular value in the frequency range between about 200 and 2000 megacycles per second, although not necessarily being limited to that range. The invention is herein illustratively described by reference to the presently preferred embodiments thereof; however, it will be recognized that certain modifications and variations therein concerning details and specific forms are possible without departing from the essential features involved.

In the range of frequencies wherein the products of this invention fill an important need, conventional wave guide forms result in unduly large, bulky and heavy systems. Moreover, long runs of conventional wave guides introduce phase dispersion as between frequency components, which limits permissible modulation basebandwidth. Conventional wave guides of certain forms, particularly rectangular guides, have a tendency to distort from differential pressures in highly pressurized apparatus, unless made quite heavy and rigid.

Coaxial transmission lines, on the other hand, are generally unsuitable at frequencies above about 500 magacycles per second. Furthermore, the use of insulation beads in coaxial wave guides or lines imposes a peak breakdown power limitation as well as a limitation on average power transmitting capacity permissible within the maximum safe heating limitations of the insulation material. Vibration resistance and structural rigidity are also limited in coaxial lines, as is the safe ambient operating temperature. For example, in the case of teflon as the insulation material the maximum safe ambient operating temperature is about 200° C.

A general object of the present invention is to provide a novel wave guide configuration and forms thereof which essentially combine the advantages of wave guides and coaxial transmission lines without their deficiencies and shortcomings.

A related object is an improved wave guide form which is particularly useful in applications wherein reduction of bulk and savings of weight are important, such as in airplanes, on shipboard and in high-elevation transmitting towers, such as television or microwave relay towers.

A related object is an improved electromagnetic wave energy guide which is superior to existing guides and lines for applications, especially in the range of frequencies mentioned and wherein long runs are involved and it is important to conduct the energy with minimum loss and phase dispersion, such as in the case of heavy ground radars, tropo-scatter installations and in ultra-large antenna arrays, such as those used in radio astronomy applications.

Still other and related objects are to provide efficient wave guides which are suitable for pressurized equipment applications, such as in undersea runs—for instance, transoceanic telephone, television or facsimile transmission, underwater data transmission systems and underwater ship and submarine guidance and communications systems.

In still other applications wherein great structural strength is important, the invention fulfills a need, examples being underground runs wherein localized pressures may be high, vehicular systems wherein acceleration, shock and vibrations are present, etc.

The invention is also directed to providing such wave guides which may be manufactured in extruded forms or by other convenient and readily implemented manufacturing techniques of known and accepted types, including, but not limited to continuous or continuously progressive forming techniques which permit the guides to be manufactured as an adjunct to the process of laying or installing them in the field, thereby to minimize storage and handling problems.

These and other objects of the invention are achieved by the novel wave guide configurations featuring inner and outer mutually contacting conductive surfaces of generally cylindrical rounded form, e.g. circular, elliptical, or of other rounded configurations, which cooperatively form a propagation space generally of lunate cross-sectional form. The inner and outer members in mutually tangential contacting relationship are joined together and form oppositely directed reentrancies at the end of the lunate space, as viewed in cross section, and because of their joinder form an extremely rigid and strong wave guide of compact configuration capable of a high degree of pressurization and having the other attributes mentioned above. If desired, multiple guides of this type may be formed, one enveloped within the other, by providing a tubular inside guide conductor for the largest wave guide and as the outside conductor of the next innermost wave guide received within it. Furthermore, the inner cylindrical member of a guide of this type may be used as the outer conductor of a coaxial transmission line housed within it.

These and other features, objects and advantages of the invention will become more fully evident from the following description thereof by reference to the accompanying drawings.

FIGURE 1 is a cross-sectional view of the improved guide in its preferred form.

FIGURES 2, 3, 4 and 5 are similar views of modified configurations.

FIGURE 6 is a further modification wherein one such wave guide is housed within another and wherein the inner guide provides an outer conductor for a coaxial transmission line within its own confines.

FIGURE 7 is a cross-sectional view showing an inductive window useful as an impedance matching device in a wave guide of the invention.

FIGURE 8 is a simplified perspective view showing a T-intersection using a guide of the type in FIGURE 1.

Figure 9:
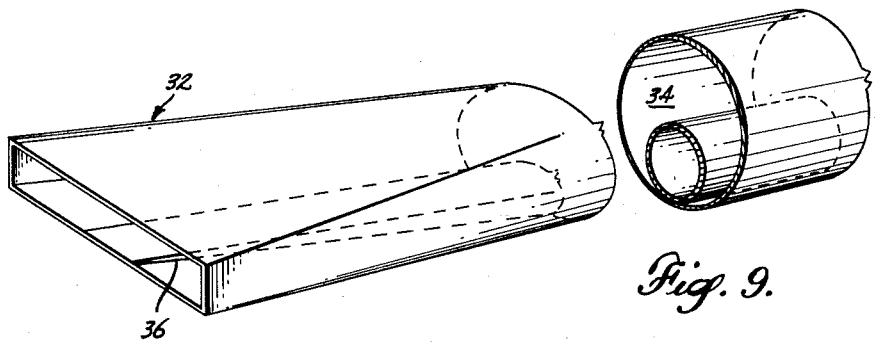
FIGURE 9 is a perspective view illustrating a transition between a rectangular wave guide and a wave guide of the invention.

The septate wave guide described by L. G. H. Huxley in "Survey of the Principles and Practice of Wave Guides," 1947, Cambridge: At the University Press, New York: The MacMillan Company, comprises essentially a coaxial transmission line wherein the center conductor is supported by a septum or plate which extends in a plane containing the central axis of the line and which plate interconnects the inner and outer conductors. While such a guide has a longer cut-off wave length than a circular or rectangular guide of the same outside circumference, it remained largely a laboratory curiosity for certain reasons. Probably most important of these deficiencies was its unsatisfactory breakdown characteristic due to the reduced spacing between opposing conductive surfaces in the maximum field regions combined with the sharpness of curvature of the inner conductor surface in a transverse sense. Furthermore, vibration resistance and structural rigidity of the septate guide are less than satisfactory for certain applications using light construction.

Like the septate guide the present invention employs a conductor within a conductor; however, unlike the septate guide the inner conductor in this case is arranged to be joined in substantially tangential contact with the interior surface of the outside conductor thereby to form a lunate space for propagation of energy within and along the length of the improved guide. Both the inside and outside conductors in the present case are of rounded cylindrical form. In FIGURE 1 the inside conductor 10 and outside conductor 12 are both circular, whereas in FIGURE 2 the outside conductor 12 is circular and the inside conductor 10a is oblate, or elliptical with tangency occurring between the conductors at the end of a minor axis of the inside conductor. In FIGURE 3 the outside conductor 12 is circular and the inside conductor 10b is oblate or elliptical, but in this case tangency occurs at the end of a major axis of the inside conductor.

In FIGURE 4 the outside conductor 12a is oblate or elliptical as is the inside conductor 10a, but in this instance tangency occurs between the conductors at the common ends of their minor axis. In FIGURE 4 an oblate or elliptical outside conductor 12b is tangent to a similarly formed inside conductor 10a with tangency occurring at the common ends of their major axes.

Wave guides of the configurations shown in these figures can be excited to propagate in the fundamental TE (transverse electric field) mode, with the internal fields developing in the lunar space defined between the two cylindrical guide surfaces, and with the circulating currents flowing in the walls of the guide in transverse directions finding a circuit completion through the point or points of contact or tangency between the two cylindrical contacting forms. The solid metal-to-metal contact, as at point A, whereat the tangentially contacting components may be welded, soldered, brazed or otherwise securely bonded together in continuously conductive relationship, and in physically integrated relationship for purposes of strength and rigidity, may comprise a very narrow or line contact or a wider contact occasioned by some flattening of the surfaces in the region of contact if desired. Soldering or brazing fillets may themselves add width to the contact zone as may the fillets which would normally be present in the case of a one-piece extruded wave guide form. The reentrant spaces B and C which are formed between the two surfaces in their approaches to contact are useful propagation spaces and serve to effectively widen the guide for purposes of decreasing its cut-off frequency in the TE mode so as to achieve nearly twice the cut-off wave length of a conventional circular guide of substantially the same external diameter.

No support insulators are required for the inner conductor 10, and its integrally bonded contact with the outer conductor 12 imparts strength and rigidity to the latter, as previously indicated. Preferably the outside conductor is of circular form or other equivalent rounded form which is chosen primarily for purposes of structural rigidity and ability to withstand pressurization without distortion. As to the problem of distortion from pressurization it will be evident that a true circular cylindrical form is optimum inasmuch as the oblate forms shown in FIGURES 4 and 5, for example, would tend to expand into a circular form under extreme differential pressure, unless of heavy-wall stiff material.

It will be observed that the inner conductor 10 in the illustrated guide forms, referring, for example, to FIGURE 1, preferably lies at its maximum spacing $a_1$ from the outer conductor 12 in the axial plane which passes through the line of tangency between the conductors. In this plane, if the guide is excited in its fundamental TE mode the voltage or electric field intensity is maximum due to the guide's symmetry about such plane. Because of the fact that the cylindrical conductor 10 lies at a considerable spacing, $a_1$, from the outside conductor in this plane, viz. due to the inner conductor's eccentricity to the extent of actual tangency with the opposite side of the outer conductor, and because of the fact that the inner conductor has a large radius and thereby a gradual curvature and smooth exterior surface, the power handling capacity and the voltage breakdown characteristics of such a guide are extremely favorable. Moreover, the spacing between the inside and outside conductors measured at different circumferential locations increasingly removed from the axial plane mentioned, decreases only gradually and in a comparatively smooth manner, with the opposing walls of the guide having no abrupt breaks or curvatures therein which could introduce voltage breakdown stress conditions. The path length along which transverse currents must flow completing their circuit around the girth or peripheral extent of the guide space is minimum for the effective breadth, and thereby for the effective cut-off wave length of the improved guide, due to the lunar configuration of the propagation space defined by the guide walls. This minimizes the attenuation factor of the guide.

In FIGURE 6 there is shown a multiple wave guide using the principles of this invention. The outside conductor 20 cooperates with the next inner conductor 22 to form one wave guide of lunar cross-sectional form, whereas the conductor 22 cooperates with a conductor 24 within it to form a second lunar wave guide. If desired, a central conductor 26 may be provided within the conductor 24, supported therein by insulated beads or otherwise, to provide a convenient coaxial transmission line within the wave guide array.

In FIGURE 7 a partition 30 is interposed across the lunar space of the wave guide in order to provide an inductive window which may be used for impedance matching. In FIGURE 8 a T-intersection is illustrated utilizing the wave guide of this invention.

In FIGURE 9 there is shown a transition from a purely rectangular guide 32 to a lunar type guide 34, utilizing a progressively expanding wedge 36 growing out of one broad wall of the guide 32 and extending lengthwise along it, such wedge decreasing in width and increasing in height while undergoing a conversion from a rectangular form into a circular form or other form corresponding to the form of the inner conductor of the guide 34 with which it merges.

Figure 10:
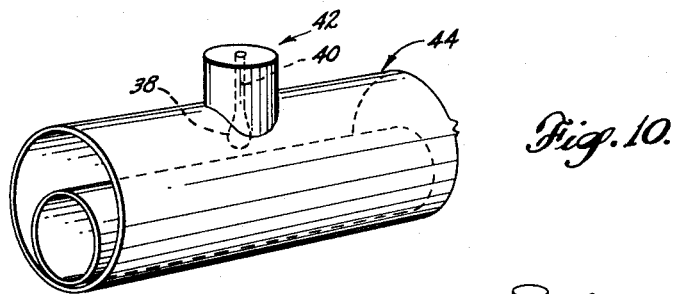
FIGURE 10 is a perspective view illustrating one means of coupling energy into and from the improved wave guide form.

In FIGURE 10 a pear-shaped coupling 38 projects from the end of the inside conductor 40 of coaxial line 42 transversely into the lunar space of the lunar wave guide or line 44, as a means of exciting the latter in its fundamental TE mode. Other means of excitation may also be employed, such as one wherein the conductor 40 extends directly across the lunar propagation space of guide 44 and makes direct contact with the adjacent wall of the inside conductor thereof.

Figure 11:
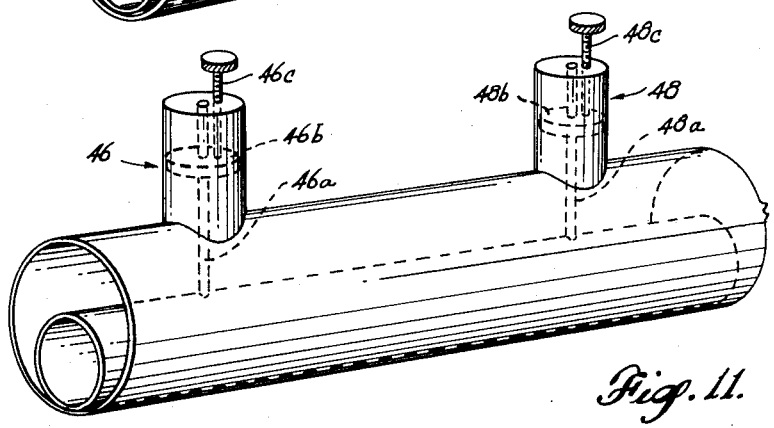
FIGURE 11 is a perspective view illustrating a doublestub tuner device for use with the improved wave guide.

In FIGURE 11 the lunate guide is provided with two longitudinally spaced tuning stubs 46 and 48 of coaxial line form. The center conductors 46a and 48c, respectively, of these tuning stubs extend across the lunate space in the manner previously described to make contact with the inside conductor of the lunar wave guide. The tuning elements or shorting plugs 46b and 48b, respectively, of these stubs are longtiudinally adjustable within the stubs by means of actuating screws 46c and 48c. This principle of a double-stub tuning technique is well known and conventional in wave guides and coaxial line applications generally.

Figure 12:
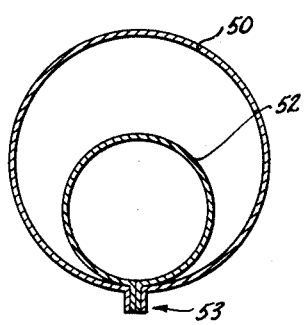
FIGURE 12 is a cross-sectional view illustrating a guide which may be made by one convenient manufacturing technique.

In FIGURE 12 there is shown another convenient method of manufacturing a lunar line or guide according to this invention. In this case, the outer conductor 50 and the inner conductor 52 are formed of sheet metal strips which are wrapped into a rounded configuration on a suitable forming die or mandrel with their end edges at the desired point of tangency being turned outwardly in mutually contacting laminar relationship as at 53, at which location the same may be spot-welded, brazed, soldered or otherwise suitably interconnected in order to form a rigid physical connection as well as a low-resistance electrical connection between the parts at the point of tangency.

As is well known in the microwave art the skin effect requires a highly conductive metal wall surface on the waveguide interior in order to maintain losses within acceptable values. Usually the interior of a guide of suitable metal is coated or plated with silver or other highly conductive metal to sustain the flow of currents attending propagation of microwave energy in the guide. This coating need not be very thick since the currents at microwave frequencies penetrate the metal only by a few thousandths of an inch or less.

These and other aspects of the invention, together with the novel characteristics and advantages thereof, will be evident to those skilled in the art based on the present disclosure of the invention in its preferred forms.

I claim as my invention:

1. In a microwave system, an electromagnetic wave guide comprising an elongated tubular outer member of generally round interior cross section, and an elongated inner member extending lengthwise in substantially continuous line contact within the interior of said outer member, said inner member being convexly curved in cross section more sharply on the average than the roundness curvature of the outer member, thereby to define an elongated inner conduction surface of substantially uniform lunate cross-sectional form throughout its length having reentrant spaces between the two members directed in mutually opposite circumferential directions of said cross-sectional form, and said inner surface having high electrical conductivity and coupling means connected to the wave guide for transference of electromagnetic energy with relation thereto.

2. A guide for electromagnetic wave energy propagation comprising an elongated tubular member having an interior wall of high electrical conductivity, said wall defining a wave propagation space of substantially uniform lunate cross-sectional form throughout its length, and means coupling to said guide a source of electromagnetic wave energy to be propagated in said space along the guide.

References Cited in the file of this patent

UNITED STATES PATENTS

| 400,094 | Limont | Mar. 26, 1889 |
| 2,129,714 | Southworth | Sept. 13, 1938 |

FOREIGN PATENTS

| 763,631 | Germany | Oct. 12, 1953 |